United States Patent [19]

Gregory

[11] Patent Number: 4,481,936

[45] Date of Patent: Nov. 13, 1984

[54] SOLAR ENERGY COLLECTOR

[76] Inventor: Howard D. Gregory, 416 Tracy Cir., Nokomis, Fla. 33555

[21] Appl. No.: 568,524

[22] Filed: Jan. 6, 1984

Related U.S. Application Data

[63] Continuation of Ser. No. 329,599, Dec. 10, 1981, abandoned, which is a continuation of Ser. No. 173,990, Jul. 31, 1981, abandoned.

[51] Int. Cl.³ .............................................. F24J 3/02
[52] U.S. Cl. .................................... 126/439; 126/438
[58] Field of Search ................ 126/438, 439; 350/292, 350/294, 296, 299, 300

[56] References Cited

U.S. PATENT DOCUMENTS 4,079,724  3/1978  Zwillinger ......................... 126/439
4,222,370  9/1980  DeGans .............................. 126/439

Primary Examiner—Samuel Scott
Assistant Examiner—G. Anderson
Attorney, Agent, or Firm—Frijouf, Rust & Pyle

[57] ABSTRACT

A solar collector which is a deep chamber defined by side walls which are segments of mathematically definable curves, that are almost, but not quite, identical. A bottom wall is parabolic. The chamber will accept the rays of the sun from morning to evening and the annular space of the chamber will direct the rays at all times in a concentrated beam to a collection point where a transducer will convert the heat energy into a useful form.

The collection point houses a transducer which is captured by separate segments of the side walls brought together and assembled into a unit with the transducer, thereby providing improved thermodynamic properties and facilitating the fabrication and erection of the device.

2 Claims, 38 Drawing Figures

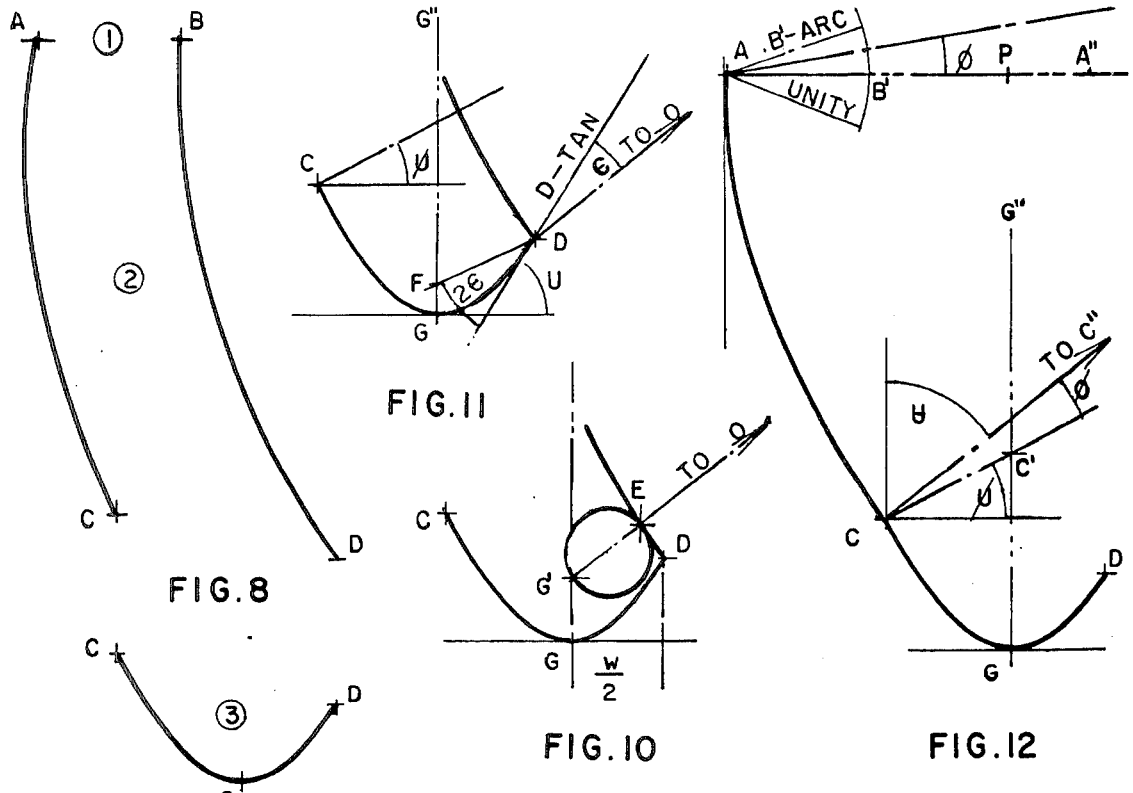
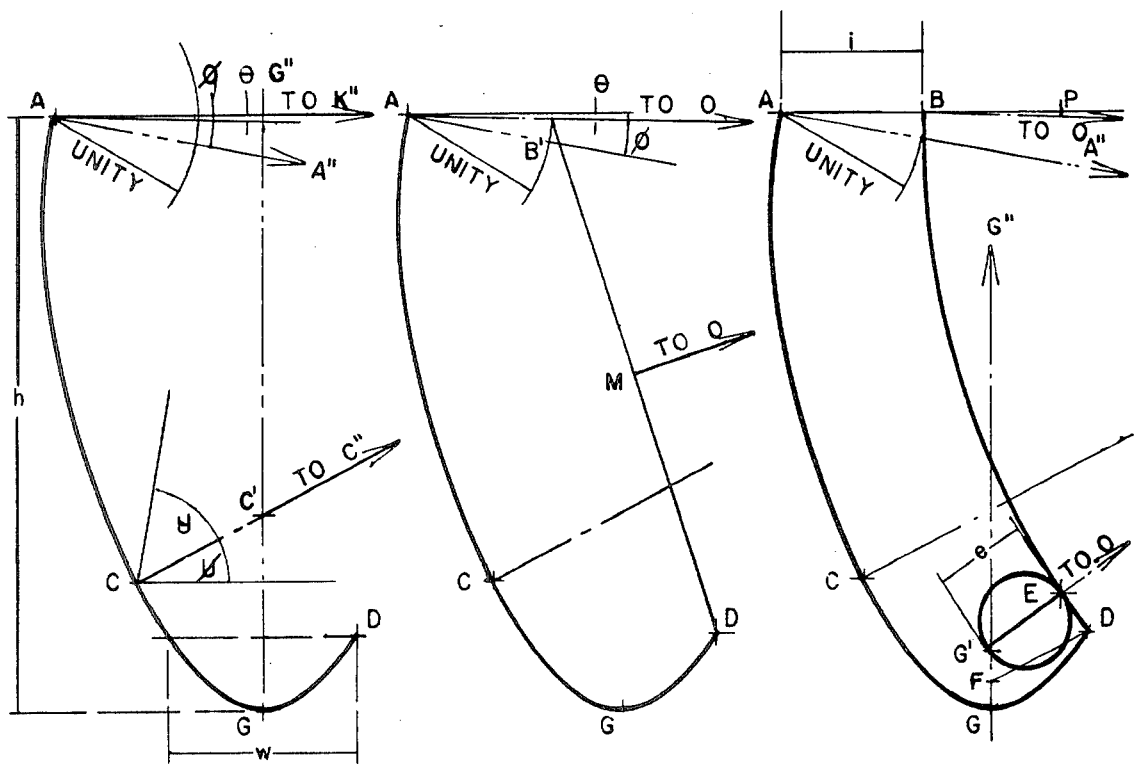

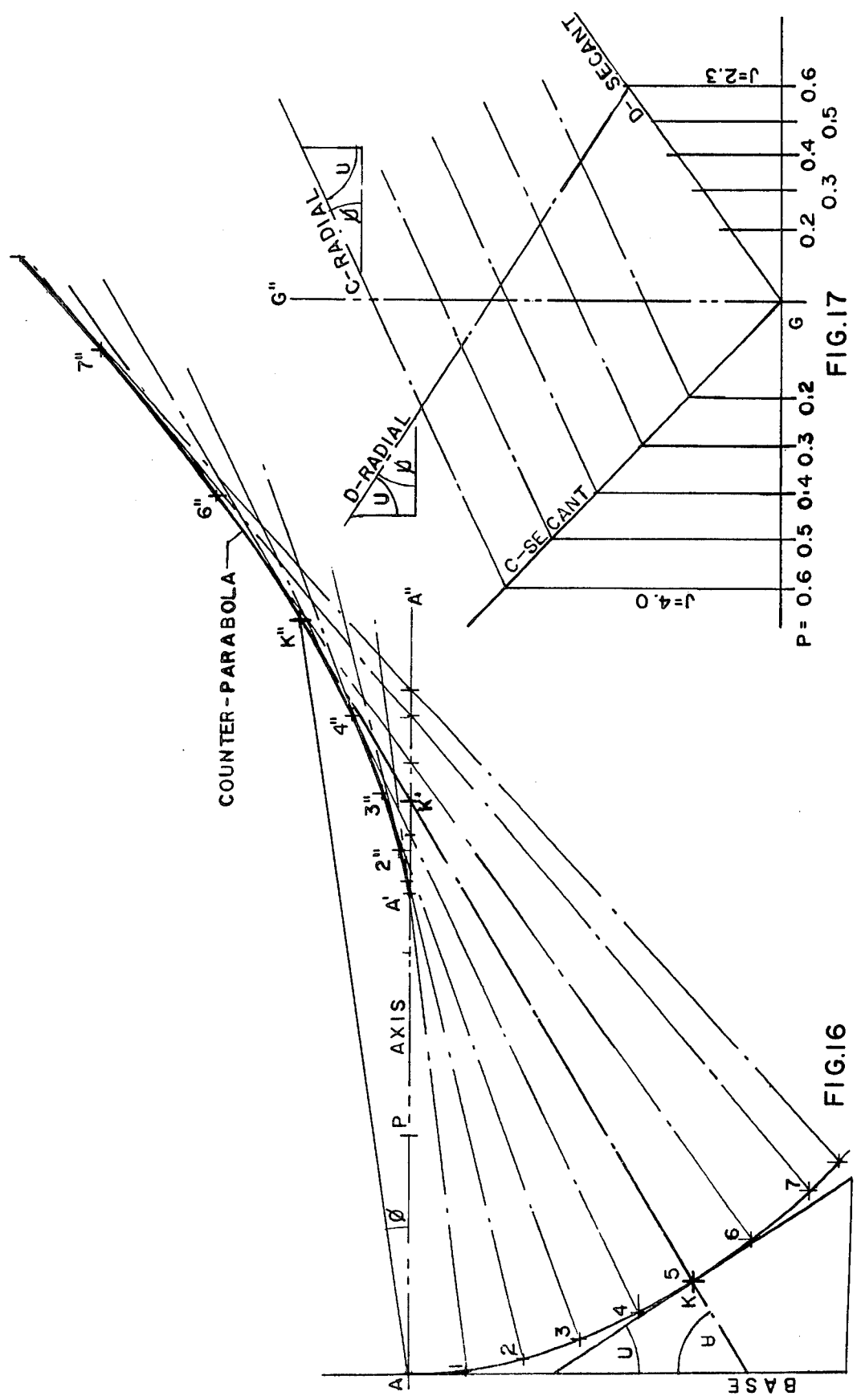

TABLE I (REF. FIG.16)
UNIVERSAL CO-ORDINATES FOR PARABOLAE
IN FUNCTIONS OF "P" (P=1.000)

| INDEX | CO-ORDINATES | | | | COUNTER-PARABOLA | | | ANGLES | | |
|---|---|---|---|---|---|---|---|---|---|---|
| | CURVE | | | CENTER | BASAL | AXIAL | DIST. | CENTRAL ANGLE ARCTAN $\frac{KfP}{2P}$ U | $90°-U$ u | ∅ |
| K | BASAL KfP | AXIAL $\frac{(KfP)^2}{4P}$ | A-K | AXIAL $\frac{(KfP)^2}{4P}+2P$ A-K' | (SINE LAW) K" | | A-K" | | | |
| A | 0.000 | 0.000 | 0.000 | 2.000 | -0.000 | 2.000 | 2.000 | 0.000° | 90.000° | 0.000° |
| 1 | 0.250 | 0.016 | 0.250 | 2.016 | -0.004 | 2.047 | 2.047 | 7.125° | 82.875° | 0.109° |
| 2 | 0.500 | 0.063 | 0.504 | 2.063 | -0.031 | 2.188 | 2.188 | 14.036° | 75.964° | 0.819° |
| 3 | 0.750 | 0.141 | 0.763 | 2.141 | -0.106 | 2.422 | 2.424 | 20.556° | 69.444° | 2.494° |
| 4 | 1.000 | 0.250 | 1.031 | 2.250 | -0.250 | 2.750 | 2.761 | 26.565° | 63.435° | 5.194° |
| 5 | 1.250 | 0.391 | 1.310 | 2.391 | -0.480 | 3.158 | 3.194 | 32.005° | 57.995° | 8.752° |
| 6 | 1.500 | 0.563 | 1.602 | 2.563 | -0.843 | 3.687 | 3.782 | 36.870° | 53.130° | 12.884° |
| 7 | 1.750 | 0.766 | 1.910 | 2.766 | -1.340 | 4.297 | 4.500 | 41.186° | 48.814° | 17.318° |
| 8 | 2.000 | 1.000 | 2.236 | 3.000 | -2.000 | 5.000 | 5.385 | 45.000° | 45.000° | 21.803° |
| 9 | 2.250 | 1.266 | 2.582 | 3.266 | -2.826 | 5.778 | 6.456 | 48.367° | 41.633° | 26.153° |
| 10 | 2.500 | 1.563 | 2.948 | 3.563 | -3.906 | 6.688 | 7.745 | 51.340° | 38.660° | 30.289° |
| 11 | 2.750 | 1.891 | 3.337 | 3.891 | -5.199 | 7.672 | 9.278 | 53.973° | 36.027° | 34.066° |
| 12 | 3.000 | 2.250 | 3.750 | 4.250 | -6.750 | 8.750 | 11.051 | 56.310° | 33.690° | 37.648° |
| 13 | 3.250 | 2.641 | | 4.641 | | | | 58.393° | 31.608° | |
| 14 | 3.500 | 3.063 | | 5.063 | | | | 60.255° | 29.745° | |
| 15 | 3.750 | 3.516 | | 5.516 | | | | 61.928° | 28.072° | |
| 16 | 4.000 | 4.000 | | 6.000 | | | | 63.435° | 26.565° | |

TABLE 2 (REF. FIG. 17)
DATA FOR NON-SYMETRICAL PARABOLAE
IN FUNCTIONS OF "P" (P=1.000)
PRINCIPAL CO-ORDINATE-AXIAL

| INDEX $\frac{2J^{0.5})P}{0.250}$ | SECANT CO-ORDINATES | | SLOPE $\frac{J^{0.5}}{2}$ | RADIAL CENTRAL ANGLE | | LENGTH of C-D C at | | |
|---|---|---|---|---|---|---|---|---|
| | AXIAL JP | BASAL $2(J^{0.5})P$ | | TANGENT $J^{0.5}$ | ARCTAN U | 90°−U | JP 3.000 | JP 4.000 | JP 5.000 |
| 11.314 | 2.000 | 2.828 | 0.707 | 1.414 | 54.736° | 35.264° | 6.371 | 7.115 | 7.892 |
| 11.593 | 2.100 | 2.898 | 0.725 | 1.449 | 55.391° | 34.608° | 6.425 | 7.155 | 7.920 |
| 11.866 | 2.200 | 2.966 | 0.742 | 1.483 | 56.012° | 33.987° | 6.480 | 7.195 | 7.948 |
| 12.133 | 2.300 | 3.033 | 0.758 | 1.517 | 56.600° | 33.400° | 6.535 | 7.236 | 7.976 |
| 12.394 | 2.4000 | 3.098 | 0.775 | 1.549 | 57.158° | 34.842° | 6.589 | 7.276 | 8.004 |
| 12.649 | 2.500 | 3.162 | 0.791 | 1.581 | 57.688° | 32.312° | 6.645 | 7.317 | 8.033 |
| 12.900 | 2.600 | 3.225 | 0.806 | 1.612 | 58.194° | 31.806° | 6.701 | 7.359 | 8.062 |
| 13.856 | 3.000 | 3.464 | 0.866 | 1.732 | 60.000° | 30.000° | 6.928 | 7.531 | 8.184 |
| 16.000 | 4.000 | 4.000 | 1.000 | 2.000 | 63.435° | 26.565° | 7.531 | 8.000 | 8.531 |
| 17.888 | 5.000 | 4.472 | 1.118 | 2.236 | 65.905° | 24.095° | 8.184 | 8.531 | 8.944 |

TABLE 3
UNIVERSAL CO-ORDINATES
FOR
CIRCULAR ARCS
*IN FUNCTIONS OF "R" (R=1.000)*

| | CO-ORDINATES | | | ANGLES | | | RADIUS |
|---|---|---|---|---|---|---|---|
| INDEX NO. | BASAL | AXIAL | | CENTRAL ANGLE | | | $\dfrac{0.5AK}{SIN\,0.5U}$ |
| | $KfR$ | $R-(R^2-(KfR)^2)^{0.5}$ | $SIN(0.5AK)$ | $2\,ARCSIN\,0.5AK$ | $90°-U$ | |
| K | | | AK | U | ย | K-K' |
| A | 0.000 | 0.000 | 0.000 | 0.00000 | 0.000° | 90.000° | 1.000 |
| 1 | 0.100 | 0.010 | 0.100 | 0.05000 | 5.732° | 84.268 | 1.000 |
| 2 | 0.200 | 0.020 | 0.201 | 0.10050 | 11.536° | 78.464° | 1.000 |
| 3 | 0.300 | 0.046 | 0.304 | 0.15200 | 17.486° | 72.514° | 1.000 |
| 4 | 0.400 | 0.083 | 0.409 | 0.20450 | 23.600° | 66.400° | 1.000 |
| 5 | 0.500 | 0.134 | 0.518 | 0.25900 | 30.021° | 59.979° | 1.000 |
| 6 | 0.600 | 0.200 | 0.632 | 0.31600 | 36.842° | 53.158° | 1.000 |
| 7 | 0.700 | 0.286 | 0.756 | 0.37800 | 44.420° | 45.580° | 1.000 |
| 8 | 0.800 | 0.400 | 0.894 | 0.44700 | 53.103° | 36.897° | 1.000 |
| 9 | 0.900 | 0.564 | 1.062 | 0.53100 | 64.146° | 25.854° | 1.000 |
| 10 | 1.000 | 1.000 | 1.414 | 0.70700 | 90.000° | 0.000° | 1.000 |

TABLE 4
CO-ORDINATES FOR UNITS CANTED $\phi°$

| CANT POINT | 0° HORIZ | 0° VERT | 5° HORIZ | 5° VERT | 10° HORIZ | 10° VERT | 15° HORIZ | 15° VERT |
|---|---|---|---|---|---|---|---|---|
| G | 0.000 | 0.000 | 0.000 | 0.000 | 0.000 | 0.000 | 0.000 | 0.000 |
| A | -1.451 | 4.033 | -1.094 | 4.144 | -0.729 | 4.224 | -0.358 | 4.271 |
| B | -0.451 | 4.033 | -0.086 | 4.144 | 0.296 | 4.224 | 0.694 | 4.271 |
| C | -0.880 | 0.880 | -0.800 | 0.953 | -0.714 | 1.019 | -0.622 | 1.078 |
| D | 0.667 | 0.506 | 0.709 | 0.446 | 0.745 | 0.382 | 0.775 | 0.316 |
| E | 0.478 | 0.766 | 0.542 | 0.721 | 0.603 | 0.671 | 0.660 | 0.616 |
| G' | 0.000 | 0.440 | 0.038 | 0.438 | 0.076 | 0.433 | 0.114 | 0.425 |
| O | 4.932 | 3.799 | 5.243 | 3.335 | 5.513 | 2.865 | 5.742 | 2.373 |
| h | 4.033 | | 4.144 | | 4.224 | | 4.271 | |
| i | 1.000 | | 1.008 | | 1.025 | | 1.052 | |
| w | 1.334 | | 1.171 | | 1.112 | | 1.054 | |
| i/w | 0.750 | | 0.861 | | 0.922 | | 0.998 | |

TABLE 5
LATITUDE
CANT $\phi$ - PITCH $\theta$ - DECLINATION $z$

| PITCH—NOMINAL | FLAT | TENTH | SIXTH | FIFTH | FOURTH | THIRD | HALF |
|---|---|---|---|---|---|---|---|
| —SLOPE | — | 1/5 | 1/3 | 1/2.5 | 1/2 | 1/1.5 | 1/1 |
| —ANGLE $\theta$ | 0.0° | 11.3° | 18.4° | 21.8° | 26.6° | 33.7° | 45.0° |
| LATITUDE | | | CANT | ANGLE | $\phi$ | | |
| 0° | 0.° | | | | | | |
| 5° | 5° | | | | | | |
| 10° | 10° | 0° | | | | | |
| 15° | 15° | 5° | 0° | | | | |
| 20° | | 10° | 5° | 0° | MEXICO CITY | | |
| 25° MIAMI | | 15° | 10° 5° | 5° | 0° | | |
| 30° | | 15° | 15° 10° | 10° | 5° | 0° | |
| 35° MEMPHIS | | | 15° | 15° 10° | 10° | 5° 0° | |
| 40° | | | | 15° | 15° | 10° 5° | |
| 45° MINNEAPOLIS | | | | | 15° | 10° | 0° |
| 50° | | | | | | 15° | 5° |
| 55° | | | | | | | |
| 60° MOSCOW | | | | | | | 10° |
| | | | | | | | 15° |

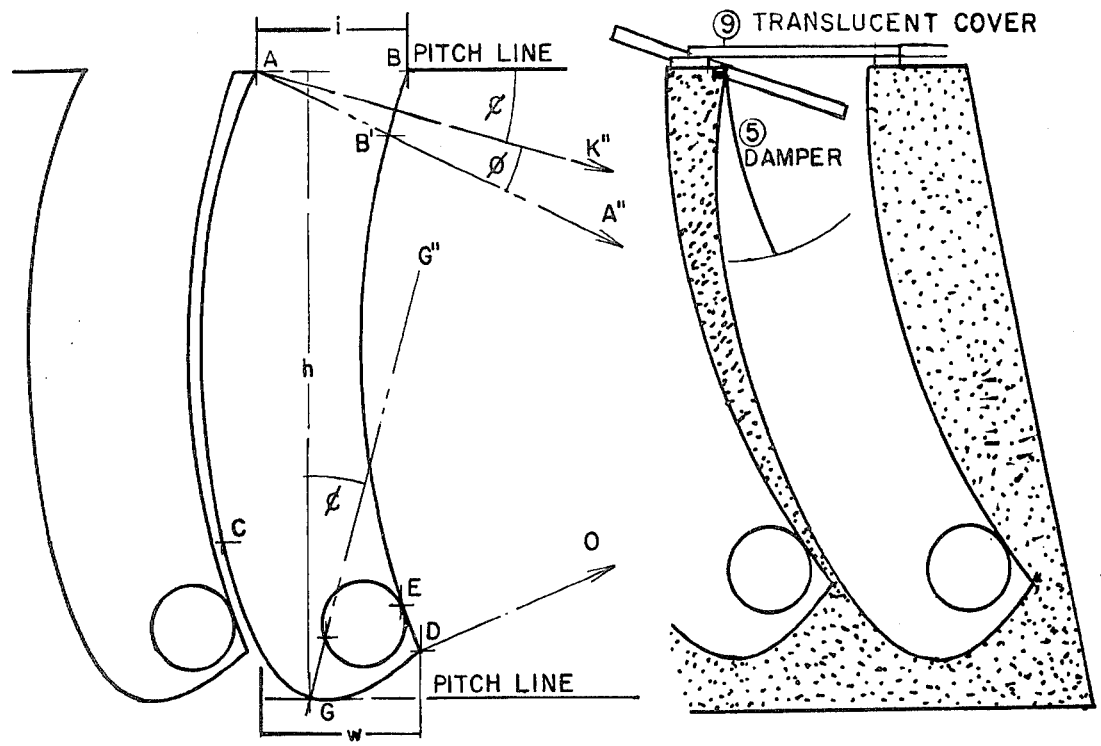
FIG.25  FIG.26
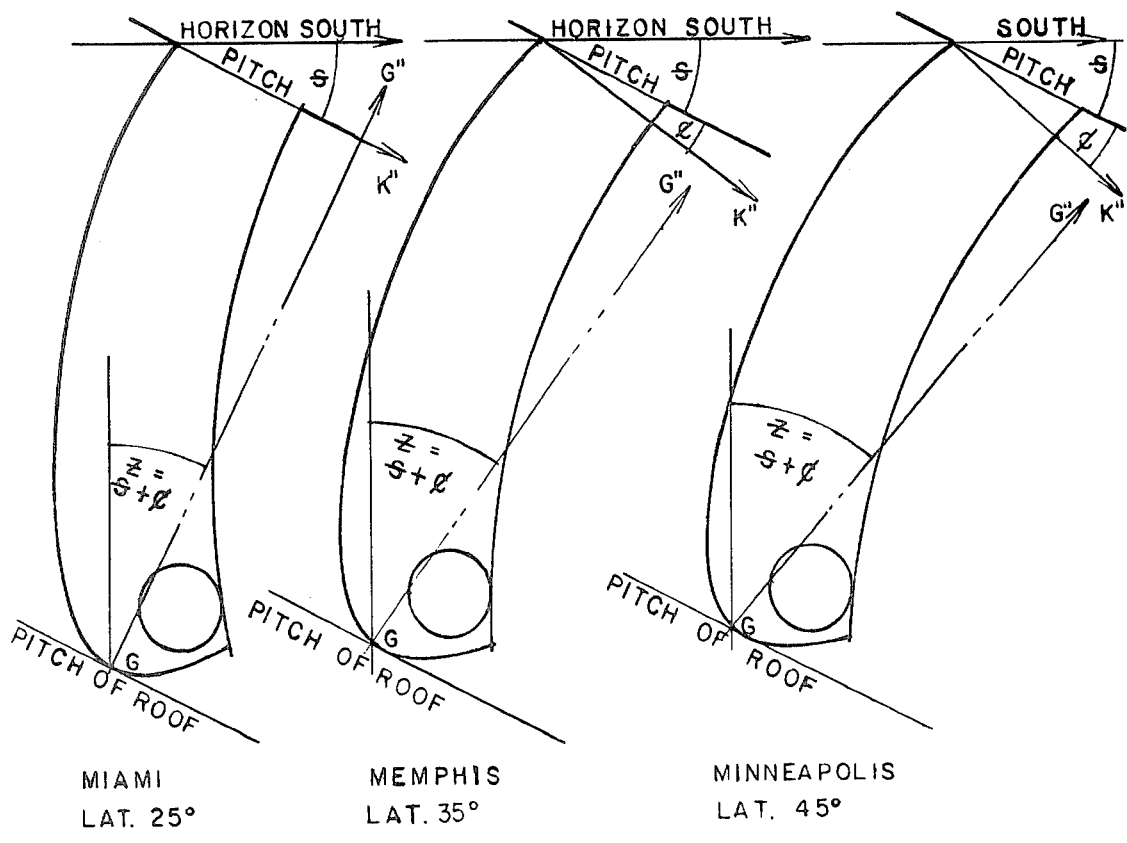
MIAMI
LAT. 25°
FIG.27
MEMPHIS
LAT. 35°
FIG.28
MINNEAPOLIS
LAT. 45°
FIG.29

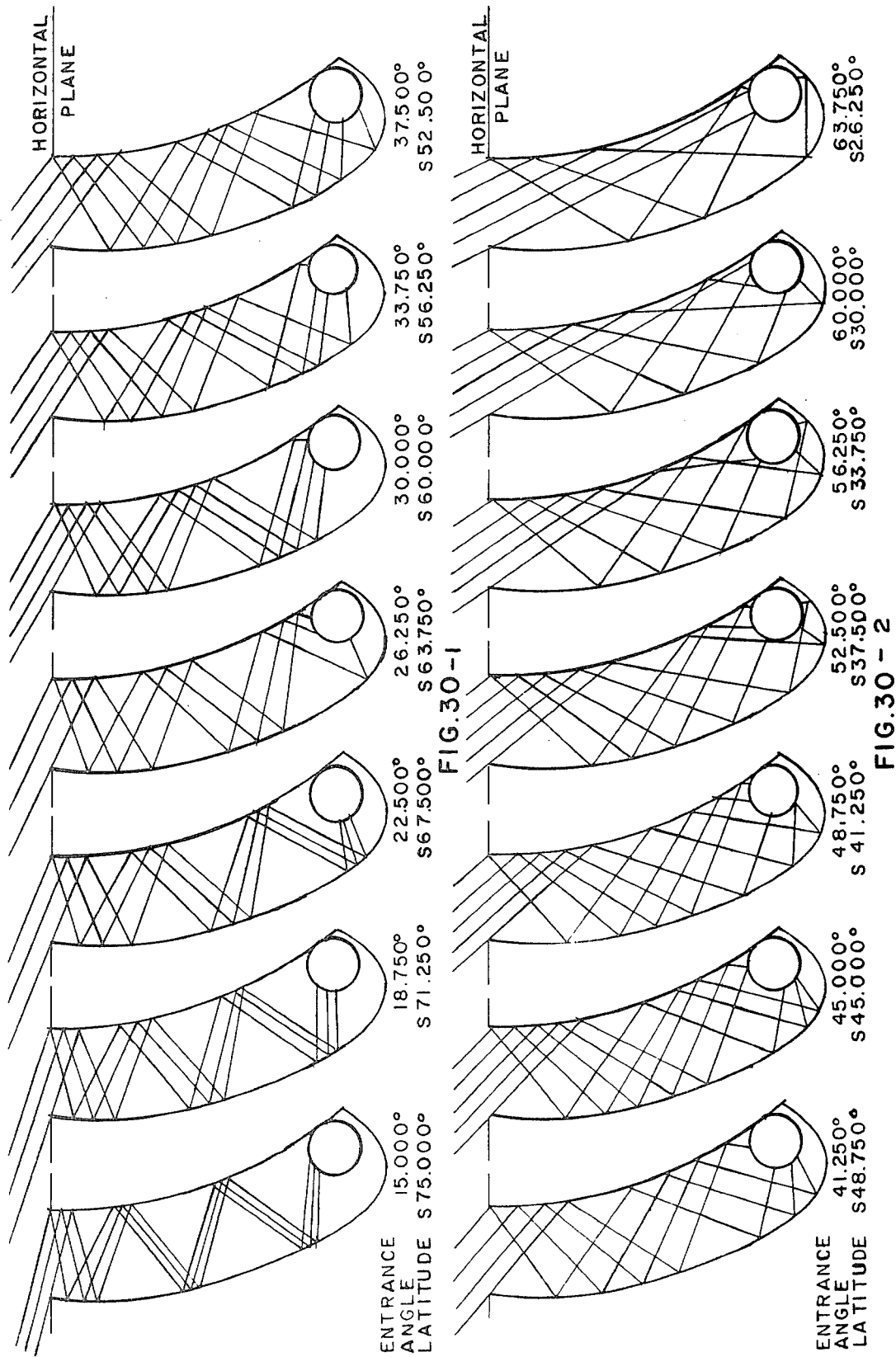

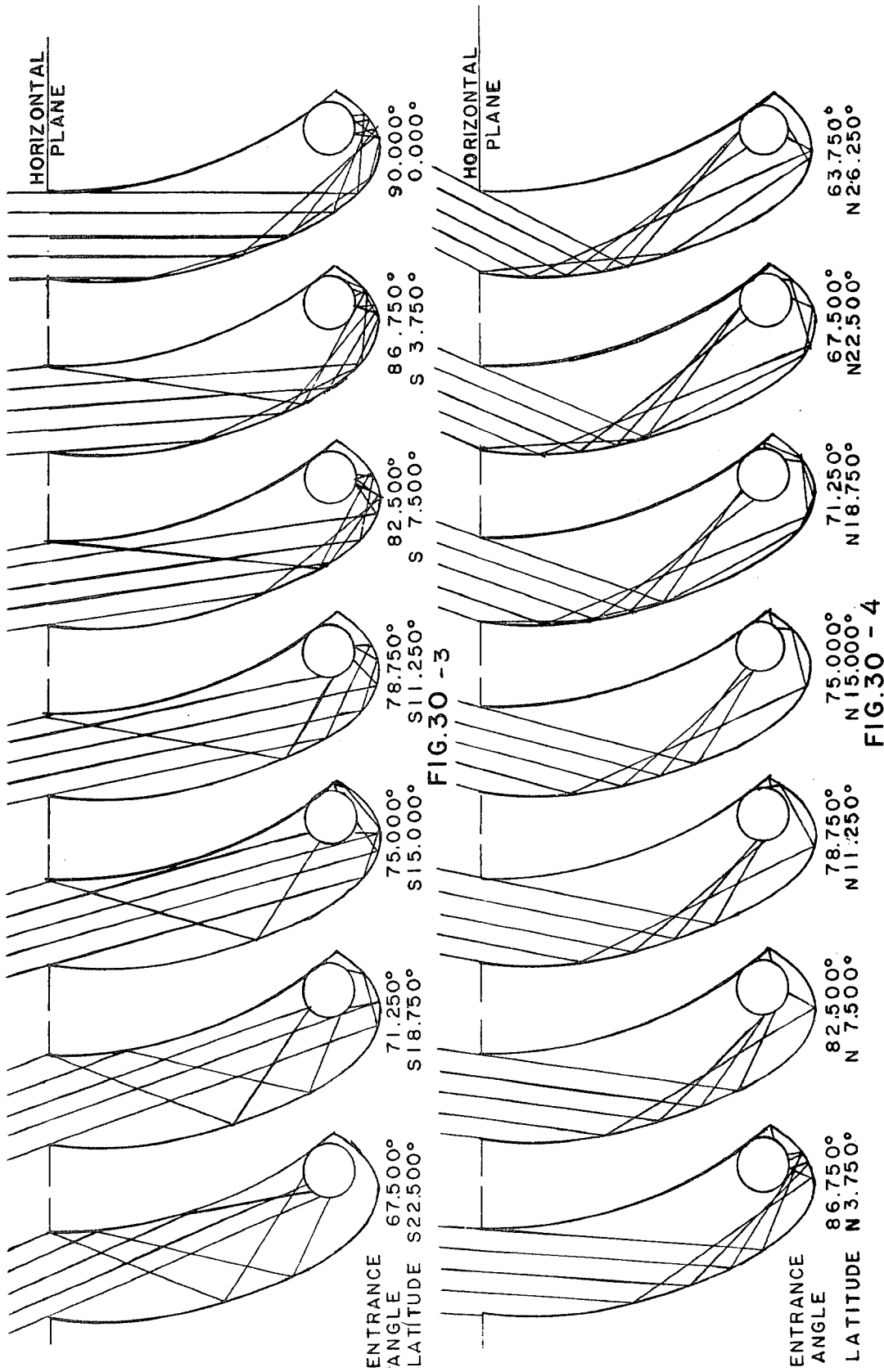

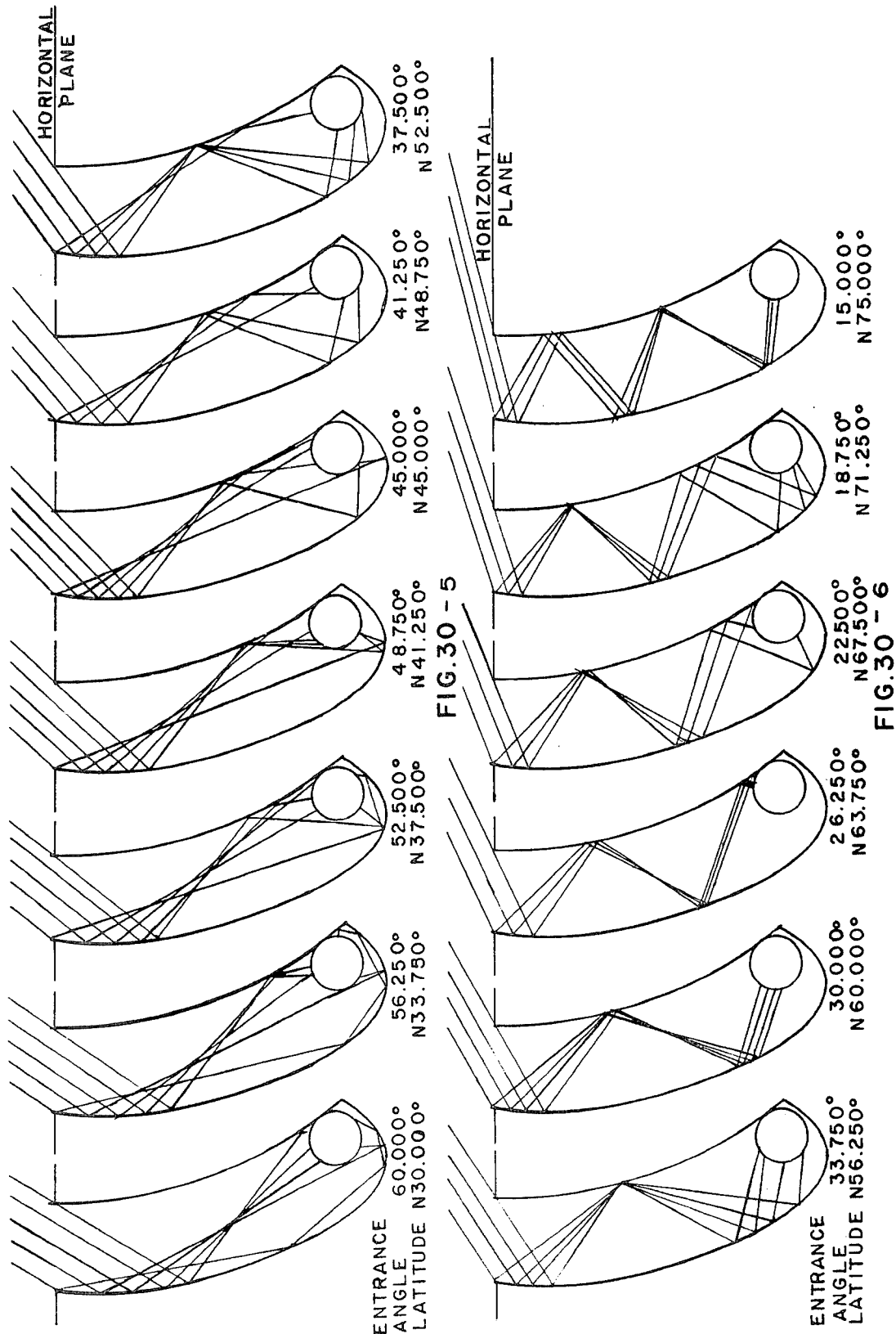

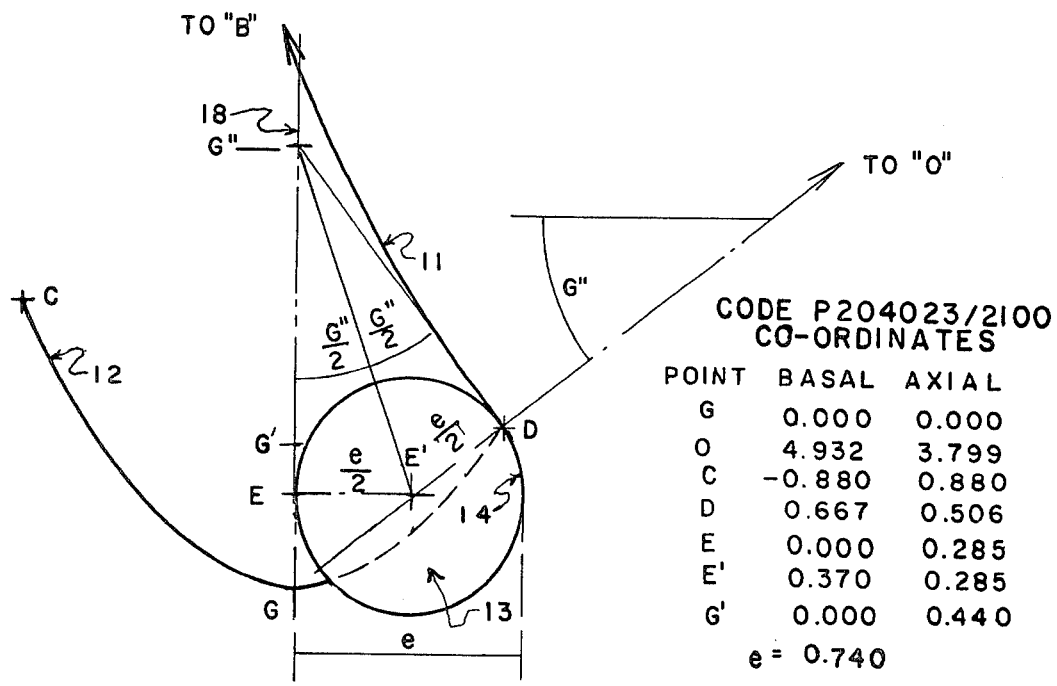
FIG. 31
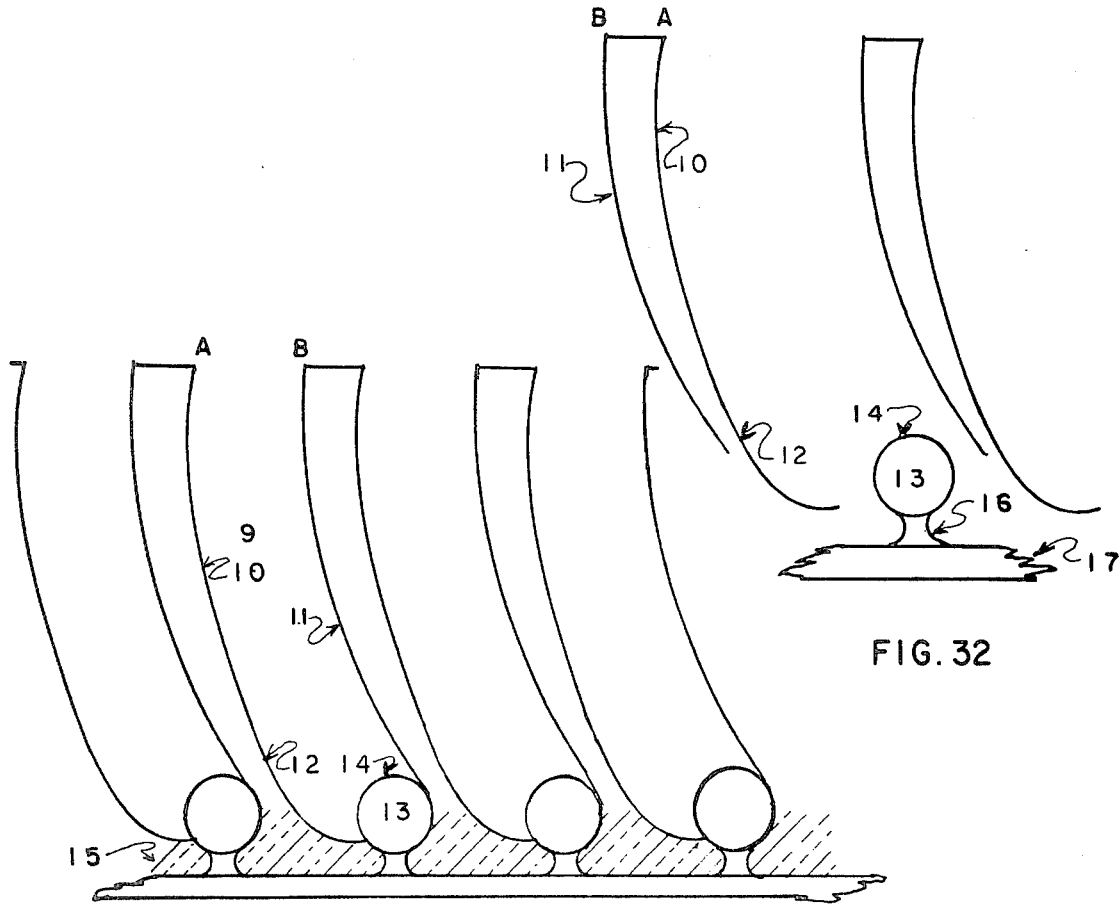
FIG. 32
FIG. 33

SOLAR ENERGY COLLECTOR

RELATED SUBJECT MATTER

This is a continuation of application Ser. No. 329,599, filed Dec. 10, 1981, now abandoned, entitled Solar Energy Collector, by inventor Howard D. Gregory, which was a continuation of application Ser. No. 173,990, filed July 31, 1981, now abandoned.

This invention is an improvement on the Solar Energy Collector-Application Ser. No. 173,990, identified by the term "CABODGE", an acronym of the letters used to identify the points which control the form and configuration of that device. The letters in that acronym are used in this application retaining the same significance and connotations as in the original application.

DESCRIPTION OF PRIOR ART

The prior application for the CABODGE Solar Energy Collector portrayed a deep chamber (9), closed by cooperating arcuate sidewalls, one concave (10) and one convex (11), a parabolic bottom wall (12), plane end walls each perpendicular to the plane of an open top through which rays of solar energy can enter the deep chamber.

Within the deep chamber is an entrapment (13) described as "the area through which all entrant rays must pass either directly or reflectively".

SUMMARY OF THE INVENTION

The nature and substance of the invention is embodied in four functional components, namely: the inception annulus which is the space between a reflective, right-concave and a reflective, right-convex surface which propagates entrant solar rays to impingement on the concentrator, a reflective right-parabolic surface which focuses incident rays in the entrapment area, which is the location and dimensions for placement of an energy exchanger to capture and utilize all entrant solar rays. To recognize that the transfer of heat through a surface is reversible and proceeds from the warm to the cooler side; and to enhance the maximum capture of energy. A deflecting damper with variable control compatible with the energy exchanger prevents destructive accumulations of energy in the entrapment area.

The device is linear in design so it can be used as a single unit (FIGS. 1 and 2), or as multiple units in series, in juxtaposition or in juxtaposed series (FIGS. 4–7).

It is an object and purpose of this invention to capture and control all solar rays which enter the device through an aperture provided for such entrance.

A further purpose and object is to concentrate such rays on an entrapment area where they can be transformed into other forms of energy by an energy exchanger.

A still further object is to produce temperatures in the range of 400 degrees F. to 800 degrees F.

Yet another object of the invention is to perform the aforesaid functions without benefit of any moving parts or the input of energy from any outside source.

Another object of the invention is to perform the aforesaid functions without any specific orientation or declination and by a device constructed of materials currently available and by methods and procedures in common usage by industry.

BRIEF DESCRIPTION OF THE DRAWINGS

For a fuller understanding of the nature and objects of the invention, reference should be had to the following detailed description taken in connection with the accompanying drawings in which:

FIGS. 8 through 15 and 19 through 22 portray the control points, herein identified alphabetically, and the geometrics of the design;

FIGS. 16 through 18 and Tables 1, 2, and 3 correlate nominal mathematical formulas into a system of unified rectangular coordinates for this design;

FIGS. 25–29 and 30-1 through 30-6 and Tables 4 and 5 show adaptability of this design to any geographical location.

FIG. 31 shows the limit for positioning the transducer as established by the alternate parameters, with resulting truncation of the parabolic wall by the transducer;

FIG. 32 is an exploded view illustrating the ability to fabricate the reflective surfaces separately from mass produced parts;

FIG. 33 shows an assembly of several units with thermal insulation to reduce heat loss from that position of the transducer external to the deep chamber.

DETAILED DESCRIPTION

The intensity of energy of a solar beam on a plane in space is a function of the sine of the angle of incidence between the beam and the plane. The larger the angle of incidence, the greater is the intensity and the number of solar rays of the beam which impinge on a unit area of the plane.

Figure 2:
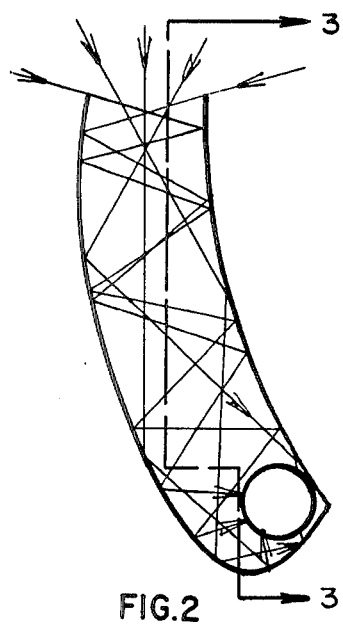
FIGS. 2 and 3 are diagramatic illustrations of the manner in which the solar rays are reflected regardless of the entrance angle thereof.

The device has such a plane with an aperture through which any beam having a component perpendicular to that plane may enter the device. That aperture is called an inception area (FIGS. 2 and 3).

Figure 3:
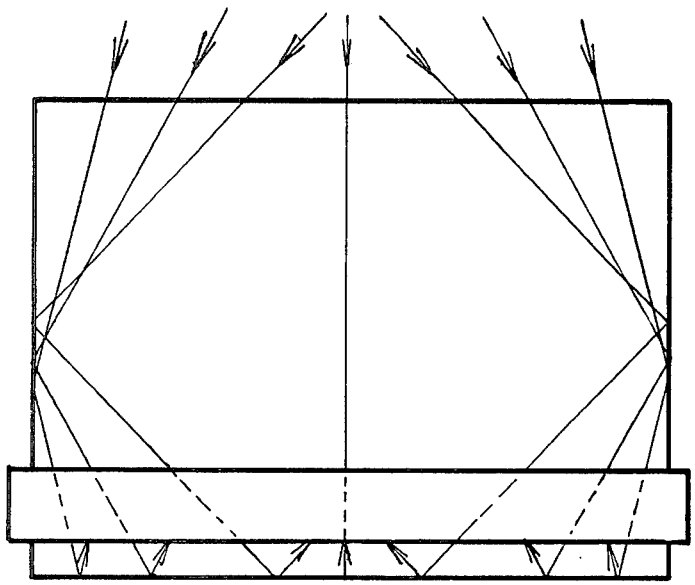

The device has reflective plane terminal closures to control beams with an otherwise errant longitudinal component (FIG. 3).

All other descriptions and figures in this disclosure relate to the form and configuration of surfaces to control the lateral components (FIG. 2) of any solar beam which enters the device, and in FIGS. 31 through 33, a developed commercial embodiment for practical manufacture and installation.

Figure 1:
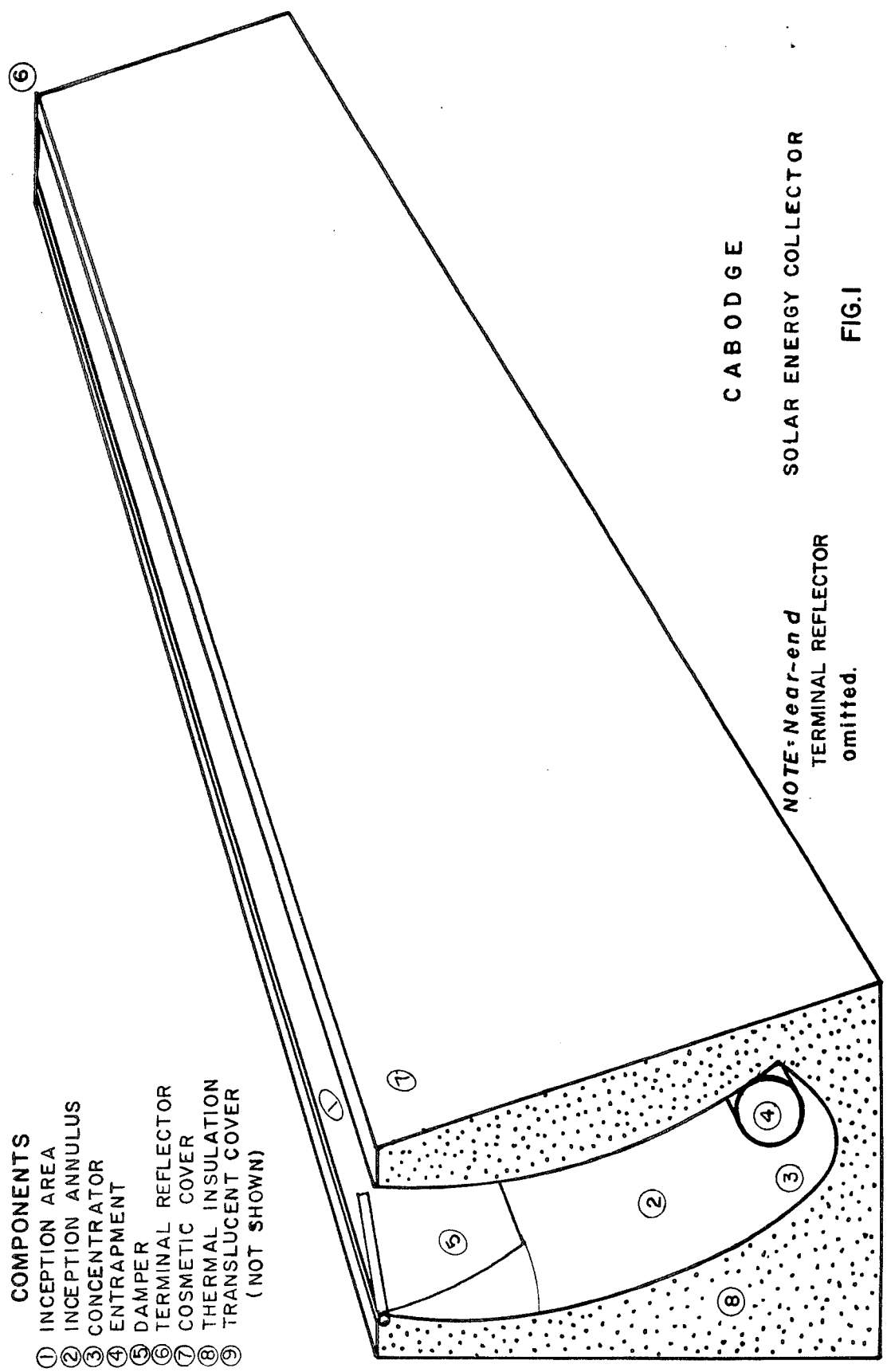
FIG. 1 is a perspective view with an end portion in cross-section of a single unit.

FIG. 15 is a cross-section of the functional components of the device shown pictorially in FIG. 1. This FIG. 15 shows the configuration in true relationships. The control points, which comprise the acronym, CABODGE, are shown in this FIG. 15. FIGS. 8, 9 and 10 are exploded views of FIG. 15. These views, together with FIGS. 11 through 14, show the integration of three mathematically definable geometric figures into the functional device.

The A-C (FIG. 8) curve is an element of the right-concave surface of the Inception Annulus. A-A" (FIG. 12) is the axis of the A-C curve. Point A is the origin of rectangular coordinates for the A-C curve and points directly related thereto.

The B-D curve (FIG. 8) is an element of the right-convex surface of the Inception Annulus. The center of this curve is point O (FIGS. 14 and 15).

The C-G-D curve (FIG. 9) is an element of the right-parabolic concentrator surface (FIGS. 9 and 12). G-G" is the axis of this curve. Point G is the origin of rectangular coordinates for all points directly related thereto.

The two curves forming the INCEPTION ANNULUS (FIG. 8) diverge from each other from the INCEPTION AREA, A-B, to assure propagation of rays through the ANNULUS from A-B to the CONCENTRATOR C-G-D (FIG. 15). To assure this divergence, center point O is so located that each radial emanating therefrom, upon intersection with a radial from the curve A-C, forms an angle with an advancing (from A-B) vertex. Any point located within the area bounded by all radials emanating from the A-C curve will satisfy this criterion.

Point C (FIGS. 12 and 13) is the point of compound curvature in the concave surface A-C-G-D of the device; i.e., only one radial emanates from point C although that point is common to two different curves.

In FIG. 12, the axes A-A" and G-G" are perpendicular to each other, point C is common to both curves, and angle $\phi$ is the angular divergence of the two radii emanating therefrom. The angle Ʉ is the compliment of the central angle U for the C-C" radial of the A-C curve (FIG. 16); the angle U is the compliment of the central angle U for the C-Radial (FIG. 17) of the C-G-D curve. In FIG. 12, the angle $\phi$ is the compliment of Ʉ+Ʋ.

In FIG. 13, the A-C system has been rotated about point C through the angle $\phi$ so the radii emanating from point C coincide; and $\phi$ becomes the angular divergence between the A-A" axis and A-K", the perpendicular to the G-G" axis through point A. A-K" IS AN ELEMENT OF A PLANE OF REFERENCE for orientation of this device. Also, $\phi$ is the angle of initial divergence at A-B of the surfaces forming the INCEPTION ANNULUS.

The angle Ʋ, as a compliment of the angle (Ʉ+$\phi$), (FIG. 12) determines the index (Table 2) for the point C in the C-G-D curve.

Point B' (FIG. 12) is in the A-A" axis at a UNIT distance from Point A. This UNIT—the PURE NUMBER 1.000—is the UNIT for evaluating the relationships in the configuration of the design of this device. ALL LINEAR VALUES USED IN THE NUMERICS HEREIN ARE FUNCTIONS OF UNITY.

The B'-Arc (FIG. 12) has its center at point A and a radius of UNITY. It intercepts a unit of length in any radial emanating from point A, including the A-A" axis. Therefore, A-B' is a fraction of P—(1.000÷P) where P defines a parabolic curve A-C (or a fraction of R—(1.000÷R) where R defines a circular curve A-C).

The B'-Arc also intersects the A-O radial (FIG. 14). Therefore, O-B' is O-A minus 1.000, which is the radius O-B (FIG. 15) of the B-D curve.

There are two limits to the entrance angle of solar beams entering the INCEPTION AREA:
 the first: parallel to the plane of the INCEPTION area;
 the second: perpendicular to the A-A" axis.

All rays entering at the first limit impinge directly, if at all, on either the CONCAVE or the CONVEX INCEPTOR surface. Those entering at the second limit impinge on the CONCAVE surface; those entering at Point A ricochet along the concave surfaces to impingement on the convex surface at point D; those entering at point B' (FIG. 12) impinge directly on the A-C surface. Therefore, the axial coordinate of point C is equal to or greater than A-B' which is 1.000/P (or 1.000R). THE AXIAL COORDINATE OF POINT C IS NOT LESS THAN THE DECIMAL EQUIVALENT OF 1.000/P (FIG. 16 and Table 1) or 1.000/R (FIG. 18 and Table 3) for Circular A-C curve.

NOTE: The linear values in Tables 1 and 2 are functions of parabolae with P=1.000; those in Table 3 are for a circle with R=1.000. In using these tables for any other values of P or R the linear values must be multiplied by the value of P or R used.

Point D is the intersection of curves B-D and C-G-D (FIG. 15).

The center, O, for the curve B-D lies in the perpendicular bisector of the B-D secant (FIG. 14);
 the basal co-ordinate of D determines the space requirement, w, (FIGS. 10 and 13) for juxtaposed units;
 as noted above, a solar ray entering perpendicular to the A-A" axis at point A will ricochet along A-C-G-D, and reflect from point D. The angle of reflection is 2ε with the D-Tan (FIG. 11) and intersects the G-G" axis at point F. ε is the angular departure of the D-O radial from the D-Tan (FIG. 11).

Definition of the C-G-D curve is attained through the use of the Nomograph (FIG. 17) and Table 2.

NOTE: Table 2 is related to Table 1 by the INDEX "K", but FIGS. 16 and 17 display different aspects of the Parabola: P=1.000. In the Nomograph (FIG. 17), a parabola, having G-G" as an axis, will intersect both the C-secant and the D-secant at the same value of P (but non-symmetrically) at different values for the axial co-ordinates: say C=4.0P; D=2.3P.

Figure 19:
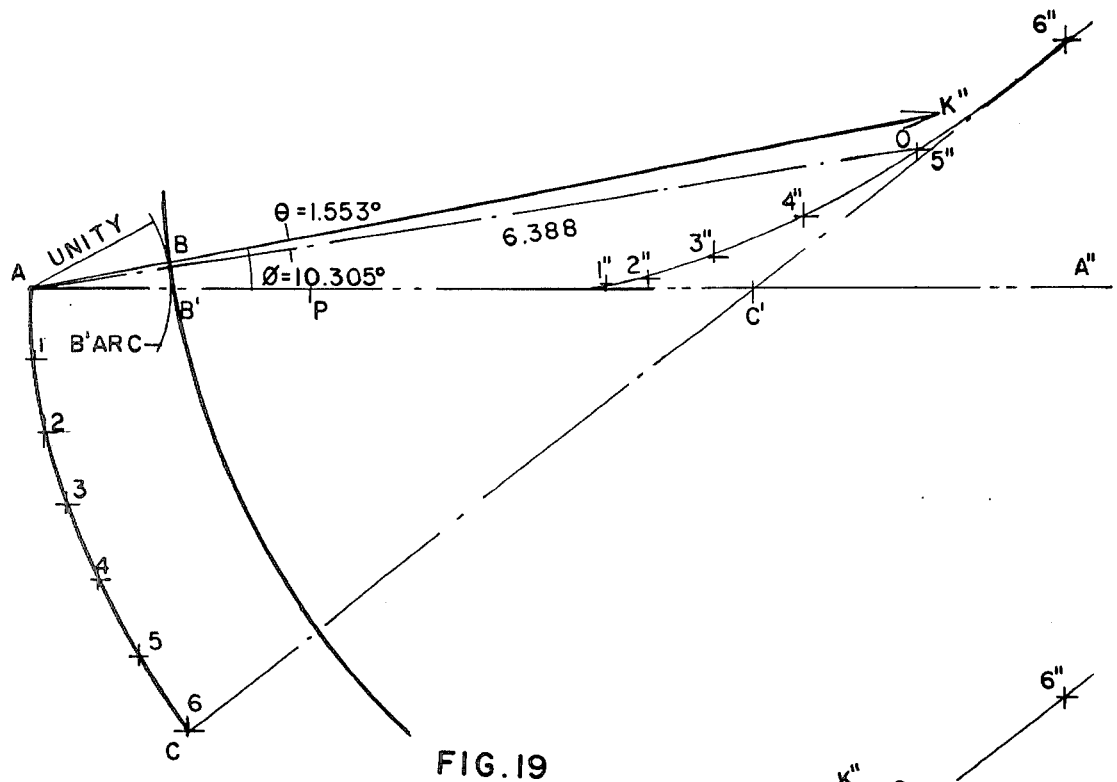
Figure 20:
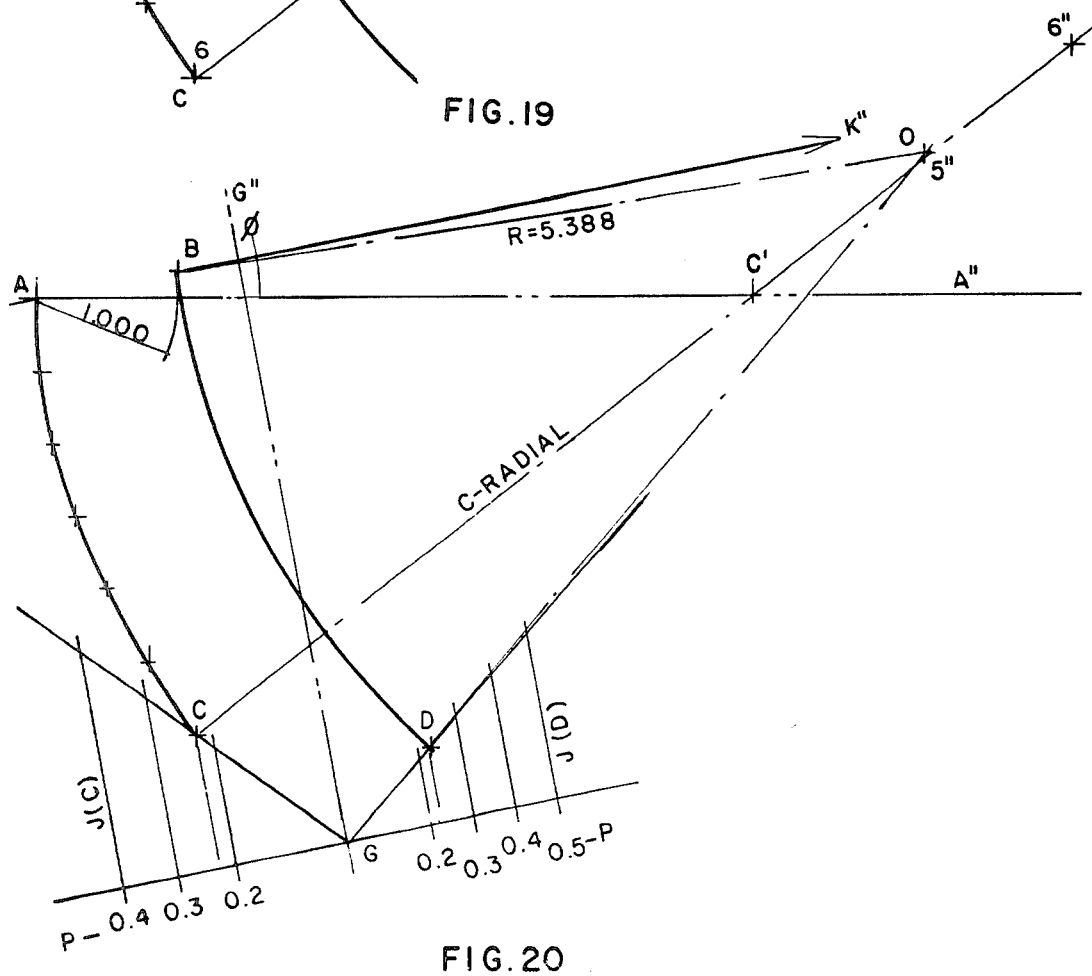

FIG. 19 shows the A-C curve, the B'-Arc, center point O, and an arc with Radius O-B', all constructed in accordance with the aforestated criteria. FIG. 20 is identical to FIG. 19, but with the Nomograph (FIG. 17) overlaid in such a manner that:
 point C (of A-C) lies in the C-Secant (FIG. 17);
 the C-C' radius (A-C) is parallel to the c-radial (FIG. 17);
 the B-D curve intersects the D-secant at point D;
 the P scale has the same value for point C and for point D;
 the C-G-D curve is a non-symmetrical segment of one parabola, as shown in FIG. 9.

Figure 21:
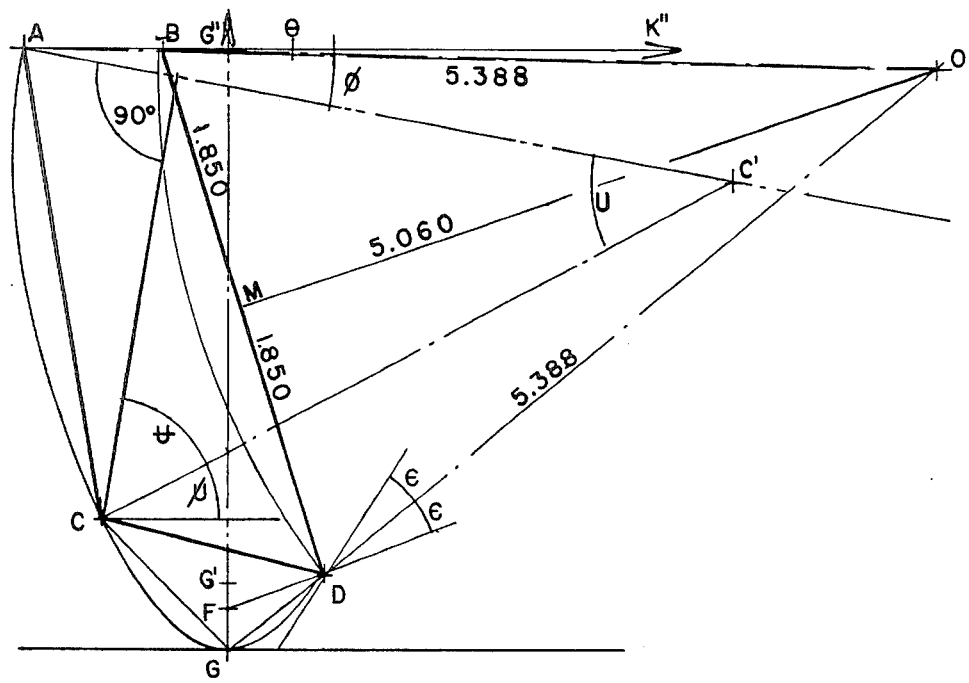

FIG. 21 shows the complete GEOMETRICS for the INCEPTION ANNULUS and CONCENTRATOR for the device.

Figure 22:
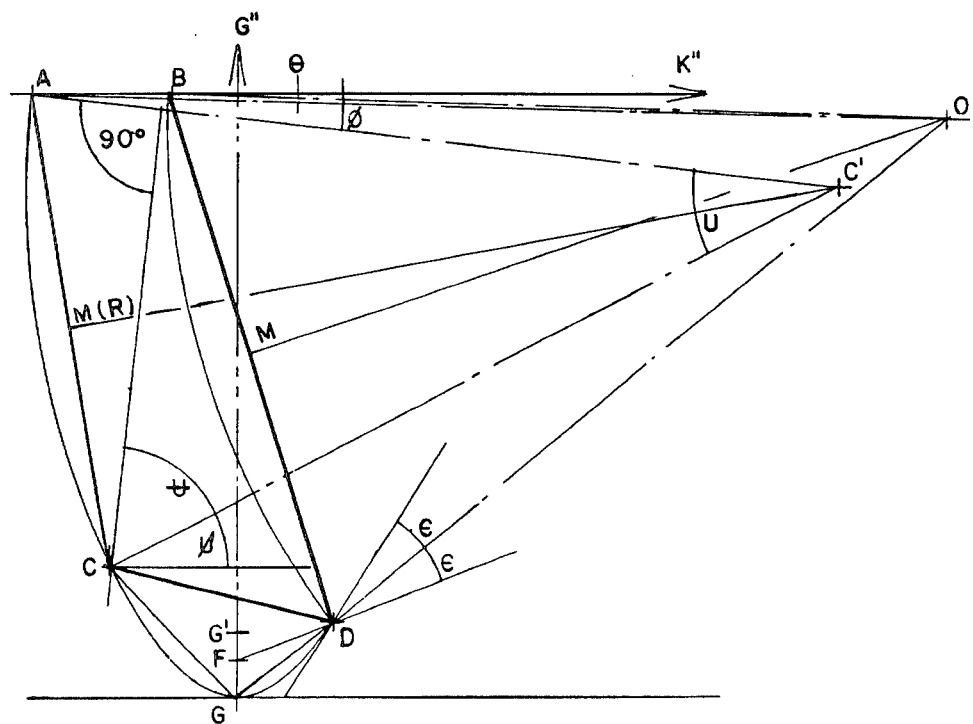

The ENTRAPMENT AREA is an area through which all entrant rays must pass, either directly or reflectively. The smallest such area lies between point G', the center of curvature at point G, and the B-D curve. This area will entrap all rays except those impinging on the C-G segment and reflected through the area between point F and G' (FIGS. 21 and 22).

The shortest distance from point G' to the B-D curve is a segment of the O-G' radical. This segment has a length of O-G' minus O-B' (radius of the B-D curve). Point E is one terminus of this segment (FIG. 10). A circle, with a diameter equal to E-G' will intercept the reflective path D-F (FIG. 15) and the path of all other rays reflected from the C-G segments. A three-dimensional energy exchanger which circumscribes this cricle will capture all solar rays which enter the device.

Any other circle such as 14 tangent to the B-D curve and having as an element any point E in the shortest radius (G-G') of the parabola will also capture all solar rays which enter the device (FIG. 31) even though it may truncate the shorter cusp 19 of the C-G-D parabola and require external thermal insulation to reduce heat loss.

The DEFLECTING DAMPER (FIG. 26) is a segment (or overlay of a segment) of the concave inceptor surface, A-C, hinged at the top, and provided with a counter-balance, or control arm to provide fail-safe operation. It is in a normally closed position, and opened by the control device, compatible with the energy exchanger (both furnished by others), only to the extent that the energy exchanger (by others) can tolerate the energy input.

NUMERICS

The NUMERICS used herein to exemplify the foregoing GEOMETRICS utilize certain opted values, as noted. The opted values have been determined emperically to approach optimum, and are used without prejudice to any other values, to rationalize the GEOMETRICS of the configuration of the device.

A-C SYSTEM: (PARABOLIC) (OPTED)
 Focal Distance: P=2.000 (OPTED)
 Initial Divergence: $\phi=8°$ to $12°$ (TRIAL)
  NOTE: 2.000 is the multiplier for all linear values from Table 1 in this calculation.
 Axial co-ordinate for "C"

$$\text{Decimal equivalent} \frac{1.000}{P} = \frac{1.000}{2.000} = 0.500$$

From Table 1 read:
 At Index 6; Axial co-ordinate=0.563
 $0.563 \times 2.000 = 1.126 \cong A-B$ (USE)
 $\Psi = 53.130°$; then $$\Psi + \phi = 53.130° + \frac{8° + 12°}{2} = 63.130° \text{ (TRIAL)}$$

From FIG. 12 read:

$$\nu = 90° - (\Psi + \phi) = 90° - 63.130°$$
$$= 26.870°$$

From Table 2 read:
 At INDEX 16: $\nu = 26.565°$ (USE)
From FIG. 12 read:

$$\phi = 90° - (\Psi + \nu) = 90° - (53.130° + 26.565°)$$
$$= 10.305°$$

From Table 1 read:
 At INDEX 5: $\phi = 8.752°$
From FIG. 14 read:

$$\theta = \text{declination } A - O \text{ from } A - K'''$$
$$= 10.305° - 8.752° = 1.553° \text{ (TRIAL)}$$

USE:
 Point C at INDEX 6
 Point O at INDEX 5" (Trial)
A-C SYSTEM Co-ordinates (Parabolic) (FIG. 12):

| POINT | CO-ORDINATES | |
|---|---|---|
| | AXIAL | BASAL |
| A Origin | 0.000 | 0.000 |
| C INDEX 6 | 2 × 0.563 = 1.126 | 2 × 1.500 = 3.000 |
| C' INDEX 6' | 2 × 2.563 = 5.126 | 2 × 0.000 = 0.000 |
| O INDEX 5" | 2 × 3.158 = 6.316 | 2 × −0.480 = −0.960 (Trial) |

$$\text{Radius } O - B = A - 5'' - 1.000 = (2 \times 3.194) - 1.000$$
$$= 6.388 - 1.000 = 5.388$$

C-G-D SYSTEM (FIG. 17 and Table 2):
 C-Secant j=4.000 (INDEX 16)
 D-Secant j=2.3 (INDEX 12.133) (OPTED)
 From FIG. 20 read: (Scalar)
  P=0.22
  NOTE: 0.22 is the multiplier for all linear values used from Table 2 in this example.
C-G-D SYSTEM Co-ordinates (FIG. 12):

| POINT | AXIAL | BASAL |
|---|---|---|
| G Origin | 0.22 × 0.000 = 0.000 | 0.22 × 0.000 = 0.000 |
| C (16.000) | 0.22 × 4.000 = 0.88 | 0.22 × −4.00 = −0.88 |
| D (12.133) | 0.22 × 2.300 = 0.506 | 0.22 × 3.033 = 0.667 |

FIG. 13 shows the A-C and the C-G-D systems unified, with point C and the radials which emanate therefrom coincident and the G-G" axis vertical. Rectangular coordinates for this unified system are attained as follows:

Step one: transpose the origin of the A-C system from point A to point C;

Step two: rotate the A-C system through angle $\phi$ (10.305°) to make A-K" perpendicular to the G-G" axis;

Step three: reverse the axial and basal axes for the A-C system in step two;

Step four: add, algebraically, the coordinates for point "C" of the C-G-D system to the coordinates of each point of the A-C system in step three.

The coordinates for the concave curves as shown FIGS. 13 and 21 are as follows:

| POINT | COORDINATES | |
|---|---|---|
| | AXIAL | BASAL |
| G | 0.000 | 0.000 |
| A | 4.033 | −1.451 |
| C | 0.880 | −0.880 |
| D | 0.506 | 0.667 |
| G' | 0.440 | 0.000 |

When the Angle $\theta$ is 2.5° or less, the width of the INCEPTION AREA "i" (FIG. 15) is 1.000−. The coordinates for Point B (FIG. 21) are

| B | 4.033 | −0.451 |
|---|---|---|

With the coordinates for "B" and "D", and the length of B-O (5.388) given, the triangle M-B-O (FIG. 21) is solvable, and the coordinates for "M" and "O" are:

| M | 2.270 | 0.108 |
|---|---|---|

| | | |
|---|---|---|
| -continued | | |
| O | 3.799 | 4.932 | and the angle $\theta$ is 2.100°

The length of radius O-G', computable from the above coordinates, is 5.967. Accordingly, the length of "e" (FIG. 15) is 5.967−(O-B)=5.957−5.388=0.579.

The coordinates for "E", also computable from the above, are:

| E | 0.766 | 0.478 |
|---|---|---|

The height "h" (FIG. 13) is the AXIAL coordinate for "A" which is 4.033.

The basal co-ordinate for point D=w/2 (FIG. 10)=0.667. Therefore, the spacing: "w" is 2×0.667=1.334; and the utilization factor i/w=1.000/1.334=0.750.

Figure 18:
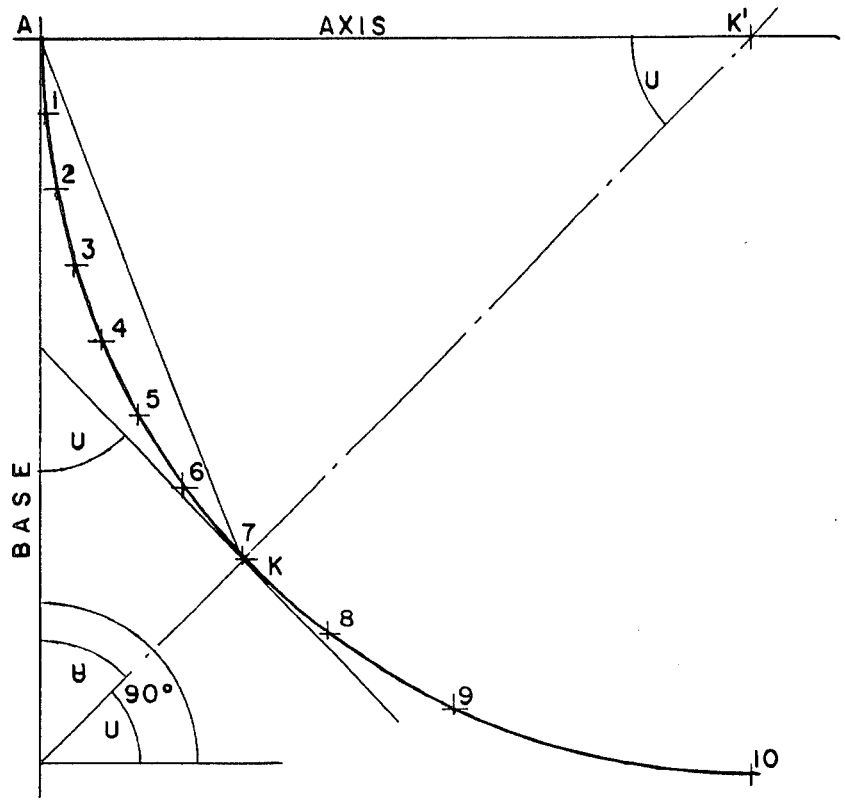
Figure 23:
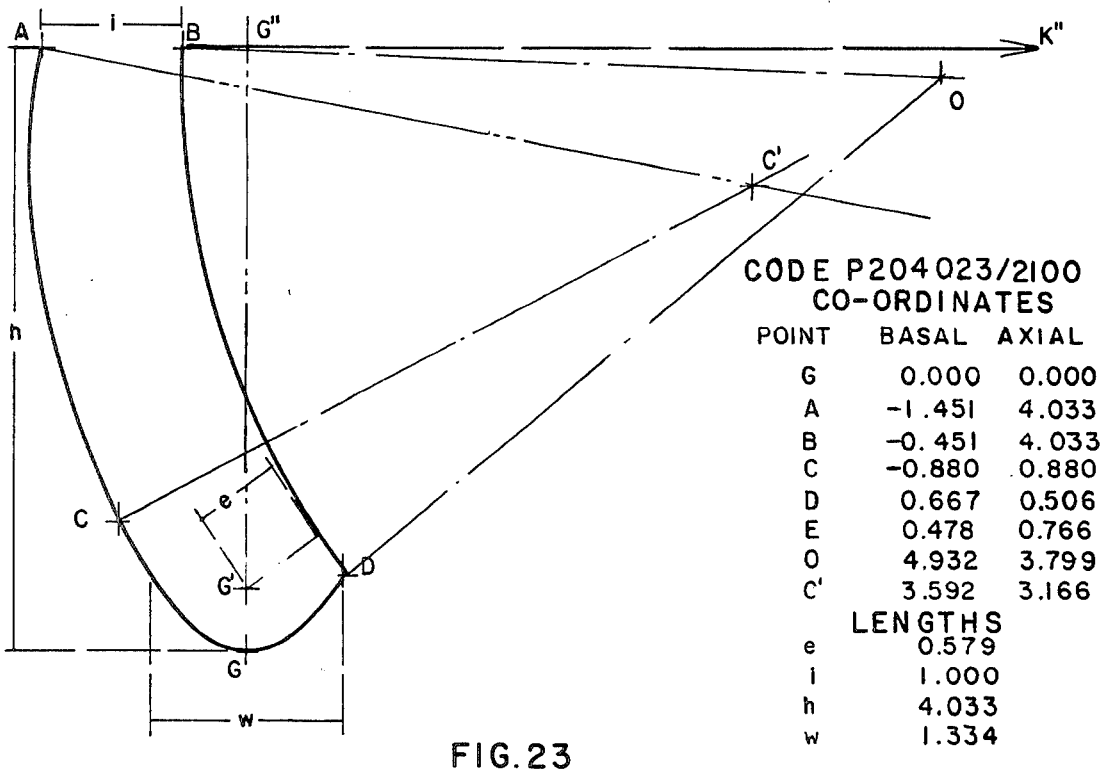
FIGS. 23 and 24 apply numerics to the geometrics of the device.
Figure 24:
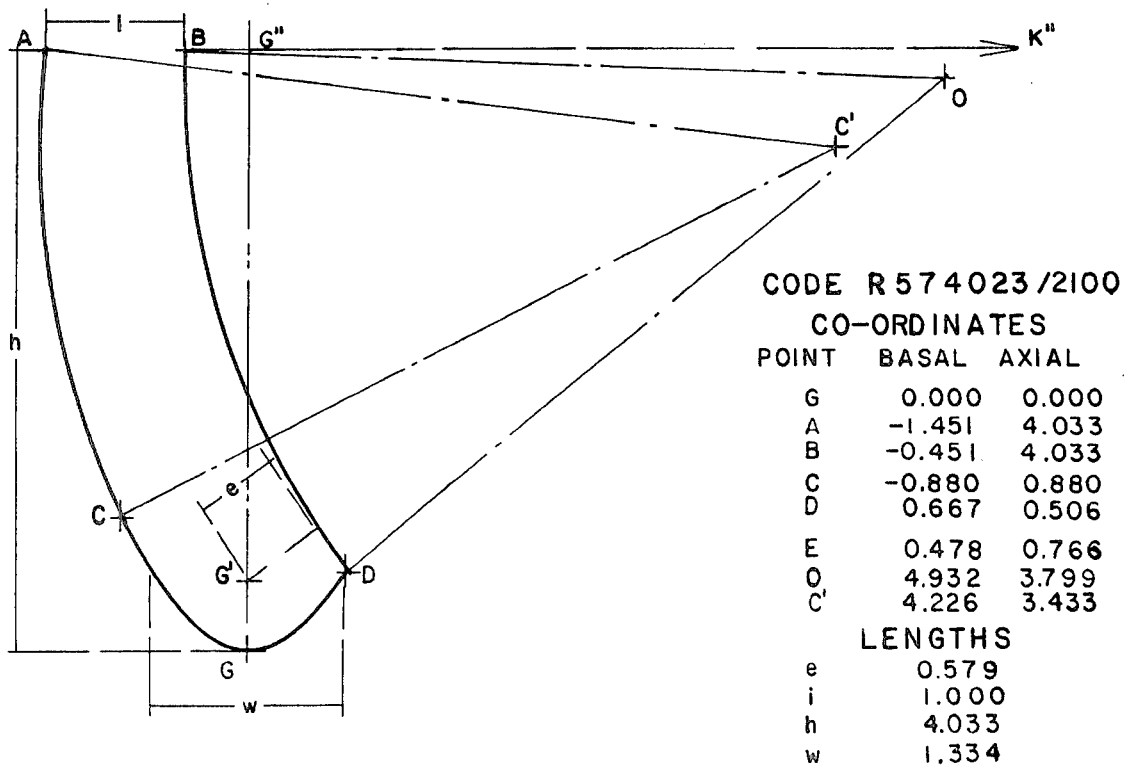

This device, as presented in this disclosure to this point has a parabolic concave inceptor surface A-C. All criteria and parameters in the GEOMETRICS hereof apply equally to a cylindrical concave inceptor surface. FIG. 18 and Table 3 are for circles rather than parabolae, and are the equivalent of FIG. 16 and Table 1 for parabolae. FIGS. 22 and 24 have circular A-C surfaces, whereas FIGS. 21 and 23 have parabolic; but the co-ordinates for all seven control points—C A B O D G and E—are the same for all four figures. This option was used to show that either type of curve will accomplish the BASIC CONCEPT, although the initial angle of divergence at the INCEPTION AREA is materially less for the circular-than it is for the parabolic-configuration, all other things being equal.

Comparative data for the two types of inceptor follow:

| | PARABOLIC | | CIRCULAR | |
|---|---|---|---|---|
| POINT | AXIAL | BASAL | AXIAL | BASAL |
| G | 0.000 | 0.000 | 0.000 | 0.000 |
| A | 4.033 | −1.451 | 4.033 | −1.451 |
| B | 4.033 | −0.451 | 4.033 | −0.451 |
| C | 0.880 | −0.880 | 0.880 | −0.880 |
| D | 0.506 | 0.667 | 0.506 | 0.667 |
| E | 0.766 | 0.478 | 0.766 | 0.478 |
| O | 3.799 | 4.932 | 3.799 | 4.932 |
| C' | 3.166* | 3.592* | 3.433* | 4.226* |
| ⌀ | 10.305°* | | 6.028°* | |

*Significant difference.

| LENGTHS | PARABOLIC | CIRCULAR |
|---|---|---|
| e | 0.579 | 0.579 |
| i | 1.000 | 1.000 |
| h | 4.033 | 4.033 |
| w | 1.334 | 1.334 |

SIZE

All linear dimensions in this disclosure are pure numbers devoid of units. These dimensions are expressed as decimals of UNITY and establish the relationships of configuration. This device can be sized to any desired specification by dividing the specific criterial dimension by the corresponding tabulated value of the device. Thus:

SPECIFICATION: size for a 4-inch (nominal) pipe entrapment "e".

DATA: the outside diameter of a 4-inch pipe is 4.500".

COMPUTATIONS:

"e"=4.500"=0.579 UNITY

UNITY=4.500"/0.579=7.772 inches.

Multiply all linear dimensions tabulated for the device by 7.772 inches. Thus:

i (INCEPTION AREA) 1.000×7.772"=7.772 inches h (height) 4.033×7.772"=31.334 inches W (spacing) 1.334×7.772"=10.368 inches To this point, this disclosure has considered only the basic concept: the INCEPTION AREA lies in the PLANE OF REFERENCE (perpendicular to the G-G" axis). FIG. 25 shows that the space requirement for units in juxtaposition is reduced when the PLANE OF REFERENCE is CANTED (ANGLE ⌀) from the PLANE IN SPACE (or PITCH LINE). This advantage is limited to approximately 15° of declination of the G-G" axis from perpendicular to the PLANE IN SPACE (PITCH LINE), or CANT (⌀) of the PLANE OF REFERENCE.

NOTE: The term "pitch line" is introduced here for the mundane consideration of the surface for mounting the device.

Figure 5:
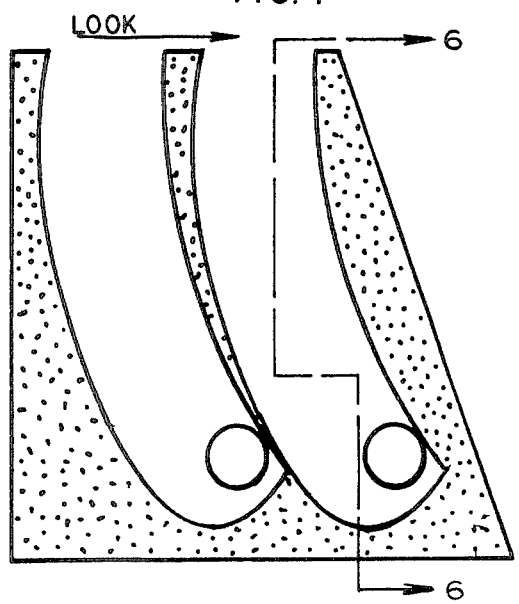

Such a CANT of the device imposes a limit on its utility unless the device is oriented to LOOK (FIG. 5) into the incident solar rays.

Table 4 lists coordinates for this device in four different values of ⌀: 0°, 5°, 10° and 15° without prejudice to the use of any other angle of CANT.

CODIFICATION

To apply NUMERICS to the GEOMETRICS of the design of this device it is necessary to opt six characteristics or values: the type of curve for the concave inceptor, the size of that curve, the slope of the C-secant, and of the D-secant for the CONCENTRATOR, the declination of the O-A radial from the PLANE OF REFERENCE, and the CANT of the PLANE OF REFERENCE from the PITCH LINE (or mounting surface). Variations in these opted values or characteristics will alter the configuration of the device in a range from a totally efficient device to a useless look-alike. A codification of the characteristics opted for any specific design enables computerized analysis of the efficacy of that design to accomplish the BASIC CONCEPT. Thus:

An alpha-numeric code showing:

FIRST CHARACTERISTIC: a letter to identify the curve for the concave inceptor surface (P for parabolic, R for cylindrical).

SECOND CHARACTERISTIC: two numerals (units and tenths) showing the value of P (for parabolae) or of R (for cylindrical).

THIRD CHARACTERISTIC: two numerals (units and tenths) showing the value of "j" (FIG. 17) for the C-secant for the CONCENTRATOR.

FOURTH CHARACTERISTIC: two numerals (units and tenths) showing the value of "j" (FIG. 17) for the D-secant for the CONCENTRATOR.

FIFTH CHARACTERISTIC: two numerals (units and tenths) showing $\theta$, the angular declination of the O-A radial from the PLANE OF REFERENCE.

SIXTH CHARACTERISTIC: two numerals (tens and units) showing ⌀, the CANT or angular departure of the PLANE OF REFERENCE from the PITCH LINE (FIG. 25).

NOTE: A "slant" in the codification separates the linear from the angular values.

Codification of some of the Figures in this disclosure is illustrative:

| FIGURE | CODE |
|--------|------|
| 21 | P204023/2100 |
| 22 | R574023/2100 |
| 25 | P204023/2115 |
| 28 | P204023/2110 |

ADAPTATION

To this point, this disclosure has treated the design of this device in general, i.e., impingement of solar rays on a PLANE IN SPACE, with the INCEPTION AREA coincident with that PLANE, and the PLANE OF REFERENCE coincident with or CANTED from that PLANE.

FIGS. 27 through 36 provide adaptation of the design to the specificity of TERRESTRIAL APPLICATION. FIGS. 25 through 29 and Table 5 introduce an external factor: the PITCH LINE, or slope of the surface on which the device must be mounted for utilization.

Figure 6:
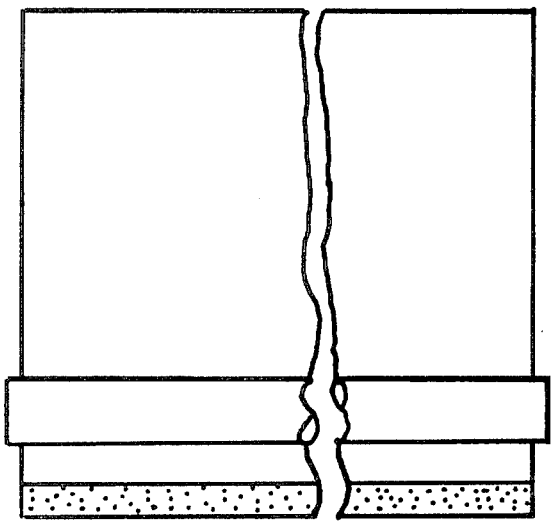

FIGS. 30-1 through 30-6 introduce consideration of the declination of a HORIZONTAL PLANE at varying terrestrial LATITUDES and LONGITUDES.

FIGS. 27 through 29 and Table 5 demonstrate the combination of (internal) CANT, angle $\mathcal{C}$, with the (external) PITCH LINE, angle $\mathcal{S}$, to provide the declination, angle Z, of the PLANE OF REFERENCE from HORIZONTAL (or the G-G" axis from ZENITH).

FIGS. 30-1 through 30-6 consists of forty-one views of angles of impingement on HORIZONTAL surfaces, in increments of 3.75° (one-quartersolar hour) from 15° above HORIZON (0700 hours solar) to 15° above HORIZON (1700 hours solar); and propagation of solar rays through the device from entrance to entrapment for each such angle. It also shows the LATITUDE at which the angle of impingement on a HORIZONTAL SURFACE will be as shown when the sun is at EQUINOX and at ZENITH at the MERIDIAN of the location of that SURFACE. This series of views gives specificity to the two components (longitudinal and lateral) of the entrance angle as indicated in FIGS. 2 and 3.

These FIGS. 27 through 30-6 and Tables 4 and 5 show the adaptability of the design of this device to any geographical location. They also provide data for determining the most effective option for the design required:

EXAMPLE

Design for a house in MIAMI, FLORIDA, with sixth pitch ridged roof; ridge north-south.

MUNDANE CRITERIA:
Latitude: 25°.
Maximum energy required: SUMMER P.M.
Solar Declination:
  Summer: 25° Lat. $-23.75° = 1.25°$ South
  Winter: $(2 \times 23.75°) + 1.25° = 48.75°$ South
Roof Pitch: (Table V) Sixth Pitch = 18.4°.
Angular Impingement on Roof (west exposure for P.M.)

A.M.: 15.00°; at 0600 hrs. $+ \frac{15.00° + 18.4°}{15.00°} = 0814$ hours

P.M.: 15.00°; at 0600 hrs. $+ \frac{165.00° + 18.4°}{15.00°} = 1814$ hours 90.00°; at 0600 hrs. $+ \frac{90.00° + 18.4°}{15.00°} = 1314$ hours Impingement on Ridge:
  Summer solstice:
    1.25° S (from Zenith) = 88.75°
    Sin 88.75° = 0.9998–100% intensity.
  Winter solstice:
    88.75° $-(2 \times 23.75°) = 41.25°$
    Sin 41.25° = 0.659–66% intensity.

OPTIMUM CONFIGURATION

Mount device on western exposure, LOOKING (FIG. 5) west (FIG. 3 parallel to ridge).

EFFICIENCY DATA

| LONGITUDINAL | | LATERAL | | | | | |
|---|---|---|---|---|---|---|---|
| DECLIN. | INTENSITY | ENT. ANGLE | INTEN. | HR. | ENT. ANGLE | INTEN. | HR. |
| | | $\mathcal{C} = 0.00°$ | | | $\mathcal{C} = 15°$ | | |
| Summer Solstice: | | | | | | | |
| 1.25°S | 100% | 15.00° | 26% | 0814 | 15.00° | 26% | 0914 |
| | | 90.00° | 100% | 1314 | 90.00° | 100% | 1414 |
| | | 30.00° | 50% | 1714 | 30.00° | 50% | 1814 |
| Winter Solstice: | | | | | | | |
| 48.75°S Use $\mathcal{C}$ 15° | 66% | SAME AS SUMMER SOLSTICE (approx.) | | | | | |

FIGS. 31 through 33 illustrate a developed commercial embodiment. This embodiment comprises a fluid conduit transducer 14 for all solar energy entering a deep chamber 9 which transducer embodiment has an energy-absorptive surface 8 within chamber 9 shielding one cusp of the parabolic bottom wall from impingement of solar rays which last cross the parabolic axis 18 outside the limits of the shortest parabolic radius. That surface, being tangent to both a convex arcuate wall and parabolic axis, and being symetrically positioned around a longitudinal axis, constitutes the periphery of the transducer 14 for making the collected energy available for use.

Figure 4:
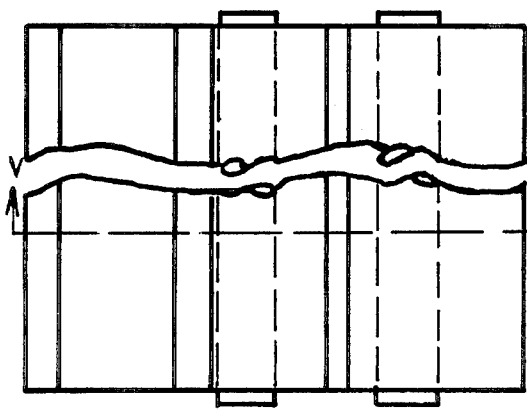
FIGS. 4 through 7 show configurations of various multiunit applications.
Figure 7:
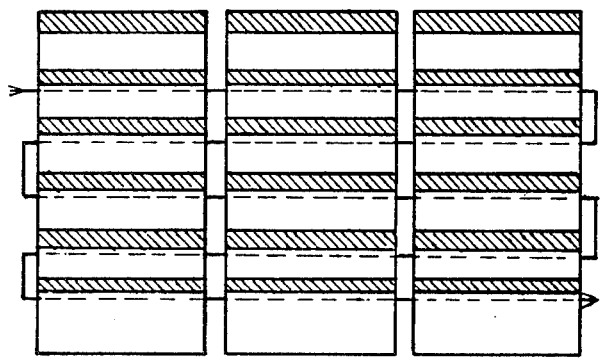

The transducer conduit is located wherever the axis thereof intersects a radial of the convex arcuate wall 11 containing any selected point in the shortest parabolic radius. Many selected points in the shortest parabolic radius will cause the periphery of the transducer to protrude beyond the parabolic wall, thus becoming external to the deep chamber. The external portion is indicated by reference character 20. The portion 20 reduces the total periphery of the transducer thereby reducing the surface within the deep chamber subject to reversible transfer of heat. The thermal insulation 19 shown in FIG. 4 will reduce the heat loss through the external portion 15.

DIRECT BENEFITS

The direct benefits of this improved design are best illustrated by the following analysis:

A deep chamber designed to a size to utilize a ¾ I P S pipe at the upper limit (FIG. 10) will accommodate a 1¼ I P S pipe at the lower limit (FIG. 31). A comparison of the pertinent data follows:

| COMPARISON | | |
|---|---|---|
| FEATURE | ¾" | 1¼" |
| External Dia. | 1.05" | 1.66" |
| Internal Dia. | 0.84" | 1.38" |
| Total Circum. | 3.30" | 5.22" |
| Within Chamber (8) | 3.30" | 2.66" |
| Transducer Cross-Section area (13) | 0.55 Sq. In. | 1.50 Sq. In. |
| Ratio (9)/(13) | 6.00/1.0 | 1.77/1.0 |

This comparison demonstrates that use of the lower limit within the parameters of this improved design reduces the area subject to heat loss by 70% per unit area of the transducer over the prior design.

COLLATERAL BENEFITS

FIG. 31 shows the external portion of the transducer is accessible for thermal insulation 15 without impairment the functioning of the deep chamber. FIG. 32 shows an external support 16 for the transducer supported by a thermal-insulating (i.e. Wood) sleeper 17. The exploded view in FIG. 32 demonstrates that the reflective elements and the transducer system of the CABODGE Solar Energy Collector can be fabricated and installed in separate units to form a complete system (FIG. 33).

This freedom of fabrication and erection restrictions permits the length of transducer runs to be determined by criteria independent of the design of the solar collector; and permits the reflective units to be erected in contiguous series in juxtaposition, thus increasing the effective utilization of available space to 90%±.

What is claimed is:

1. A solar collector, comprising:
   a deep chamber defined by cooperating first and second arcuate sidewalls united at the chamber bottom by a parabolic wall;
   the first arcuate wall being concave and the second arcuate wall being convex;
   the chamber has an open top inception area in a plane from which the arcuate sidewalls depend for receiving solar radiation;
   the shortest distance between the convex and concave sidewalls of the deep chamber diverges progressively as the distance from said plane increases;
   a transducer located near the chamber bottom to absorb said solar radiation;
   the convex, concave and parabolic walls all being reflective.

2. The configuration for a solar collector as defined in claim 1 wherein said chamber bottom extends fully along the path constituting a right parabola, thereby closing the bottom of the collector.

* * * * *